United States Patent
Caffrey et al.

(10) Patent No.: US 11,450,308 B2
(45) Date of Patent: Sep. 20, 2022

(54) METHODS AND SYSTEMS FOR CONVERTING TEXT TO AUDIO TO IMPROVE ELECTRONIC MAIL MESSAGE DESIGN

(71) Applicant: Litmus Software, Inc., Cambridge, MA (US)

(72) Inventors: Brendan Caffrey, Somerville, MA (US); David Lee Rostocil, Jr., Lakewood, OH (US)

(73) Assignee: Litmus Software, Inc., Cambridge, MA (US)

( * ) Notice: Subject to any disclaimer, the term of this patent is extended or adjusted under 35 U.S.C. 154(b) by 18 days.

(21) Appl. No.: 16/848,870

(22) Filed: Apr. 15, 2020

(65) Prior Publication Data

US 2020/0335081 A1    Oct. 22, 2020

Related U.S. Application Data

(60) Provisional application No. 62/834,433, filed on Apr. 16, 2019.

(51) Int. Cl.
*G10L 13/00* (2006.01)
*G10L 13/08* (2013.01)
(Continued)

(52) U.S. Cl.
CPC ............ *G10L 13/08* (2013.01); *G06Q 10/107* (2013.01); *H04L 51/046* (2013.01); *H04L 51/08* (2013.01);
(Continued)

(58) Field of Classification Search
CPC ..... G10L 13/08; G06Q 10/107; H04L 51/046; H04L 51/08; H04L 51/10; H04L 51/16; H04L 51/36
(Continued)

(56) References Cited

U.S. PATENT DOCUMENTS 8,977,248 B1    3/2015  Bladon
9,876,901 B1 *  1/2018  Bazzica ................. G10L 15/26
(Continued)

FOREIGN PATENT DOCUMENTS

WO    2007000698 A1    1/2007
WO    2020214658 A1    10/2020

OTHER PUBLICATIONS

International Search Report & Written Opinion dated Jul. 31, 2020 in international PCT patent application No. PCT/US2020/028250, 8 pages.

*Primary Examiner* — Imad Hussain
(74) *Attorney, Agent, or Firm* — Blueshift IP, LLC; Cynthia Gilbert

(57) ABSTRACT

A method for converting text to audio to improve a design of electronic mail messages includes converting, by a text-to-speech converter component executing on a first computing device, an electronic mail message into an audio file. The method includes analyzing, by an analysis engine executing on the first computing device, the electronic mail message, the audio file, and a transcript of the audio file to identify at least one attribute. The method includes receiving, by a recommendation engine executing on the first computing device, an identification of the at least one attribute. The method includes generating, by the recommendation engine, at least one recommendation for improving a design of the electronic mail message, based on the identification of the at least one attribute. The method includes providing, by the first computing device, to a second computing device, the audio file and the generated at least one recommendation.

18 Claims, 9 Drawing Sheets

(51) Int. Cl.
*G06Q 10/10* (2012.01)
*H04L 51/10* (2022.01)
*H04L 51/08* (2022.01)
*H04L 51/046* (2022.01)
*H04L 51/56* (2022.01)
*H04L 51/216* (2022.01)

(52) U.S. Cl.
CPC ............ *H04L 51/10* (2013.01); *H04L 51/216* (2022.05); *H04L 51/56* (2022.05)

(58) Field of Classification Search
USPC .......................................................... 704/260
See application file for complete search history.

(56) References Cited

U.S. PATENT DOCUMENTS

| | | |
|---|---|---|
| 10,839,039 B1* | 11/2020 | Wiley .................... G06F 16/958 |
| 2003/0157968 A1 | 8/2003 | Boman |
| 2004/0158429 A1* | 8/2004 | Bary ..................... G06F 16/958 |
| | | 702/183 |
| 2007/0282607 A1 | 12/2007 | Bond |
| 2009/0319927 A1* | 12/2009 | Beeman ................ G06F 40/166 |
| | | 715/764 |
| 2012/0072204 A1 | 3/2012 | Nasri |
| 2020/0153771 A1* | 5/2020 | Thies ...................... H04L 51/18 |

* cited by examiner

METHODS AND SYSTEMS FOR CONVERTING TEXT TO AUDIO TO IMPROVE ELECTRONIC MAIL MESSAGE DESIGN

CROSS-REFERENCE TO RELATED APPLICATIONS

This application claims priority from U.S. Provisional Patent Application No. 62/834,433, filed on Apr. 16, 2019, entitled, "Methods and Systems for Converting Text to Audio to Improve Electronic Mail Message Design," which is hereby incorporated by reference.

BACKGROUND

The disclosure relates to converting electronic mail (email) messages into an audio file. More particularly, the methods and systems described herein relate to functionality for converting a text of an email message into an audio file and using an analysis of the converted text to improve a design of the email message.

Conventional systems for analyzing email messages and making recommendations for improving a level of readability of the analyzed email messages or for improving a rate at which recipients open the analyzed email messages do not typically take into consideration how such messages are perceived by recipients using assistive technology such as screen readers. However, there are a variety of reasons to address the recipients of messages using such technology. Since over 25 million American adults and an estimated 1.3 billion people internationally live with some form of vision impairment, savvy communicators may wish to ensure that their messages are accessible by recipients even when such recipients rely upon assistive technologies to receive the message. Additionally, formatting of messages to satisfy accessibility standards often results in content that is more readable, logical, and better organized, which benefits all message recipients. Finally, certain communicators will be required by state or federal law to provide communications that comply with accessibility guidelines or standards. Thus, there is a need for functionality to analyze email messages as they would be heard by a recipient implementing a screen reader and improve the design, structure, and content of the underlying messages.

BRIEF SUMMARY

In one aspect, a method for converting text to audio to improve a design of electronic mail messages includes converting, by a text-to-speech converter component executing on a first computing device, an electronic mail message into an audio file. The method includes analyzing, by an analysis engine executing on the first computing device, the electronic mail message, the audio file, and a transcript of the audio file to identify at least one attribute. The method includes receiving, by a recommendation engine executing on the first computing device, an identification of the at least one attribute. The method includes generating, by the recommendation engine, at least one recommendation for improving a design of the electronic mail message, based on the identification of the at least one attribute. The method includes providing, by the first computing device, to a second computing device, the audio file and the generated at least one recommendation.

In another aspect, a system for converting text in an electronic mail message into audio and using the audio to improve a design of the electronic mail message includes a text-to-speech converter, an analysis engine, and a recommendation engine. The text-to-speech converter component executes on a first computing device, receives, from a second computing device, an electronic mail message, converts the electronic mail message into an audio file, and generates a transcript of the audio file. The analysis engine executes on the first computing device and analyzes the electronic mail message, the audio file, and the transcript to identify at least one attribute. The recommendation engine executes on the first computing device, receives an identification of the at least one attribute, generates at least one recommendation for improving a design of the electronic mail message, based on the identification of the at least one attribute, and provides, to the second computing device, the audio file and the generated at least one recommendation.

In yet another aspect, a non-transitory, computer-readable medium comprising computer program instructions tangibly stored on the non-transitory computer-readable medium, wherein the instructions are executable by at least one processor to perform a method for converting text in an electronic mail message into audio and using the audio to improve a design of the electronic mail message, the method comprising receiving, by a first computing device, from a second computing device, an electronic mail message; converting, by a text-to-speech converter component executing on the first computing device, the electronic mail message into an audio file; analyzing, by an analysis engine executing on the first computing device, the electronic mail message, the audio file, and a transcript of the audio file to identify at least one attribute; receiving, by a recommendation engine executing on the first computing device, an identification of the at least one attribute; generating, by the recommendation engine, at least one recommendation for improving a design of the electronic mail message, based on the identification of the at least one attribute; and providing, by the first computing device, to the second computing device, the audio file and the generated at least one recommendation.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The present disclosure relates to methods and systems for converting text to audio to improve structure of electronic mail messages.

Figure 1:
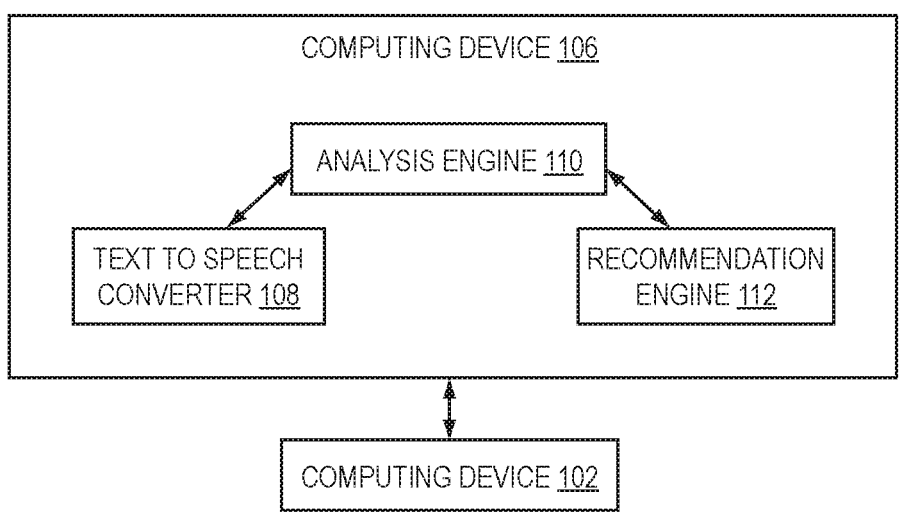
FIG. 1 is a block diagram depicting an embodiment of a system for converting text to audio to improve electronic mail message design.

Referring now to FIG. 1, a block diagram depicts one embodiment of a system 100 for converting text in an electronic mail message into audio and using the audio to improve a design of the electronic mail (email) message.

The system 100 includes a first computing device 106, a second computing device 102, a text-to-speech converter 108, an analysis engine 110, and a recommendation engine 112.

The email message may be a document in HyperText Markup Language (HTML). The email may be a document including Cascading Style Sheets (CSS). The email may be a document including a plurality of types of computer code, including, without limitation, HTML and CSS. The email message may be a template message designed for reusability in creating a plurality of email messages.

In some embodiments, the text-to-speech converter 108 is a software program. In other embodiments, the text-to-speech converter 108 is a hardware module. The text-to-speech converter 108 may include functionality for generating an audio file based on text. By way of example, the audio file may be a file formatted according to an MPEG-1 Audio Layer III or MEG-2 Audio Layer III file format (referred to generally as an MP3 file). The text-to-speech converter 108 may include functionality for generating a transcript of an audio file. By way of example, the transcript may be a document written in a speech synthesis markup language, such as, without limitation, a transcript generated by a screen reader. The text-to-speech converter 108 may include functionality for generating a speech synthesis markup language document based on the electronic mail message. The text-to-speech converter 108 may include a speech synthesis engine. The text-to-speech converter 108 may be a speech synthesis engine. The text-to-speech converter component 108 may execute on the first computing device 106.

In some embodiments, the text-to speech converter 108 is a screen reader; by way of example, and without limitation, the text-to-speech converter 108 may be a device such as a JAWS device manufactured by Freedom Scientific of Florida, USA; a NVDA device manufactured by NV Access Limited of Queensland, Australia; a VOICEOVER device manufactured by Apple Inc. of California, USA; a ZOOMTEXT device manufactured by Freedom Scientific of Florida, USA; a SYSTEM ACCESS/SA TO GO device manufactured by Seroke Corp. of Minnesota, USA; a WINDOW-EYES device manufactured by Ai Squared of Vermont, USA; a CHROMEVOX device manufactured by Google LLC of California, USA; or a NARRATOR device manufactured by Microsoft Corporation of Washington, USA. The text-to speech converter 108 may be a hardware device or a software device, or a device combining software and hardware.

In some embodiments, the analysis engine no is a software program. In other embodiments, the analysis engine 110 is a hardware module. The analysis engine 110 may execute on the first computing device. The analysis engine 110 may include one or more rules for use in identifying one or more attributes.

In some embodiments, the recommendation engine 112 is a software program. In other embodiments, the recommendation engine 112 is a hardware module. The recommendation engine 112 may execute on the first computing device. The recommendation engine 112 may include one or more rules for use in using identified attributes to generate recommendations for improving email design.

Figure 2:
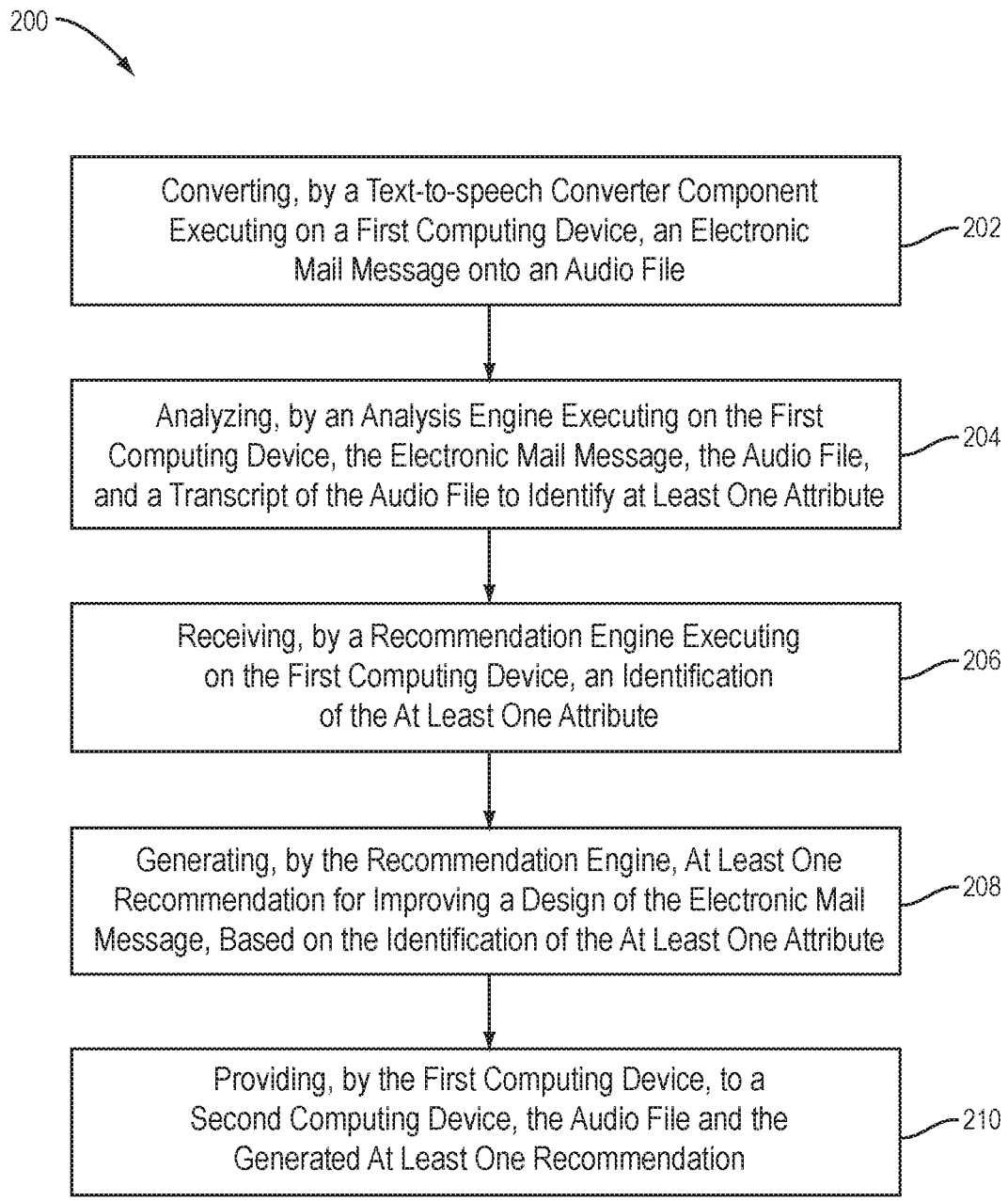
FIG. 2 is a flow diagram depicting an embodiment of a method for converting text to audio to improve electronic mail message design.

Referring now to FIG. 2, a flow diagram depicts one embodiment of a method 200 for converting text in an electronic mail message into audio and using the audio to improve a design of the electronic mail message. In brief overview, the method 200 includes converting, by a text-to-speech converter component executing on a first computing device, an electronic mail message into an audio file (202). The method 200 includes analyzing, by an analysis engine executing on the first computing device, the electronic mail message, the audio file, and a transcript of the audio file to identify at least one attribute (204). The method 200 receiving, by a recommendation engine executing on the first computing device, an identification of the at least one attribute (206). The method 200 includes generating, by the recommendation engine, at least one recommendation for improving a design of the electronic mail message, based on the identification of at least one attribute (208). The method 200 includes providing, by the first computing device, to a second computing device, the audio file and the generated at least one recommendation (210).

Referring now to FIG. 2, in connection with FIG. 1, and in greater detail, the method 200 includes converting, by a text-to-speech converter component executing on a first computing device, an electronic mail message into an audio file (202). The first computing device 106 may receive the electronic mail message from the second computing device 102. The first computing device 106 may retrieve the electronic mail message from a database of electronic mail messages. The text-to-speech converter 108 may convert the email message into the audio file. The text-to-speech converter 108 may convert the email message into an MP3 file. The text-to-speech converter 108 may generate the transcript of the audio file. The text-to-speech converter 108 may generate a speech synthesis markup language document based on the electronic mail message.

In some embodiments, the text-to-speech converter 108 generates a transcript of the email message and then generates the audio file based on the transcript of the email message. In one of these embodiments, providing the transcript to the text-to-speech converter 108 may result in generation of the audio file in a shorter period of time than a period of time needed for generating the audio file directly from the email message.

The method 200 includes analyzing, by an analysis engine executing on the first computing device, the electronic mail message, the audio file, and a transcript of the audio file to identify at least one attribute (204). The analysis engine no may analyze source HTML for the email message, audio file, and the transcript of the audio file. The analysis engine no may analyze the speech synthesis markup language document to identify at least one attribute of the analyzed data, in embodiments in which such a speech synthesis markup language document is generated. The analysis engine no may apply one or more rules to identify at least one attribute of the analyzed data. The analysis engine 110 may identify at least one attribute of the email message. The analysis engine 110 may identify at least one attribute of the audio file. By way of example, the analysis engine 110 may identify a length of the audio in the audio file. The analysis engine 110 may identify at least one attribute of the transcript of the audio file. By way of example, the analysis engine no may identify a length of the transcript. As another example, the analysis engine 110 may identify a level of readability of the transcript. Levels of readability may be determined via a combination of linguistic algorithms for determining readability, such as, without limitation, the Flesch-Kincaid readability test and by attribute comparison with documents known to be of sufficient readability. Levels of readability may be used to provide a score as to whether an email is easy to understand and to make recommendations to improve the understanding of the message. The analysis engine no may record, in a data structure, an identification of each identified attribute. By way of example, and without limitation, attributes may include an indication of whether or not the email message includes an image without an alternative text and/or an identification of a length of an email message.

The method 200 receiving, by a recommendation engine executing on the first computing device, an identification of the at least one attribute (206). In one embodiment, the analysis engine 110 transmits the identification of the at least one attribute to the recommendation engine 112. In another embodiment, the analysis engine 110 transmits, to the recommendation engine 112, a notification of an update to a data structure storing an identification of at least one attribute; the recommendation engine 112 may then retrieve the identification of the at least one attribute from the data structure.

The method 200 includes generating, by the recommendation engine, at least one recommendation for improving a design of the electronic mail message, based on the identification of the at least one attribute (208). In one embodiment, the recommendation engine 112 applies a rule to the identification of the at least one attribute. By way of example, and without limitation, the identification may include a Boolean value indicating whether or not it is true that the email message has the at least one attribute. As another example, the identification may include a plurality of values. Continuing with this example, the identification may provide an indication of whether each of the email message, the audio file, and the transcript have a particular attribute. The rule may indicate which recommendation to generate based on the value included in the identification of the at least one attribute. By way of example, and without limitation, a rule may specify that if an HTML document includes at least one image that is not associated with alternative text, the recommendation engine 112 should generate a recommendation to ensure that all images have alternative text. As another example, a rule may specify that if a ratio of an audio file length to length of an HTML document is less than a threshold, the recommendation engine 112 should generate a recommendation to check for a balance of text and images to help ensure that the email message is optimized for accessibility.

Using attributes as input, the recommendation engine 112 may generate a number of recommendations. The recommendation engine 112 may generate a recommendation to include alternate text for at least one image embedded in the electronic mail message. The recommendation engine 112 may generate a recommendation to increase an amount of text within the electronic mail message. The recommendation engine 112 may generate a recommendation to improve a level of compliance with an accessibility standard.

The method 200 includes providing, by the first computing device, to a second computing device, the audio file and the generated at least one recommendation (210). The first computing device 106 may transmit the audio file and the generated at least one recommendation to the second computing device 102. For example, the first computing device 106 may send an email to the second computing device 102 including the audio file and the at least one recommendation. The first computing device 106 may provide a notification within a user interface hosted by the first computing device 106 and made available to a user of the second computing device 102. The first computing device 106 may transmit a notification that the system has generated a new recommendation that is available by accessing a web site associated with or hosted by the first computing device 106.

Figure 3A:
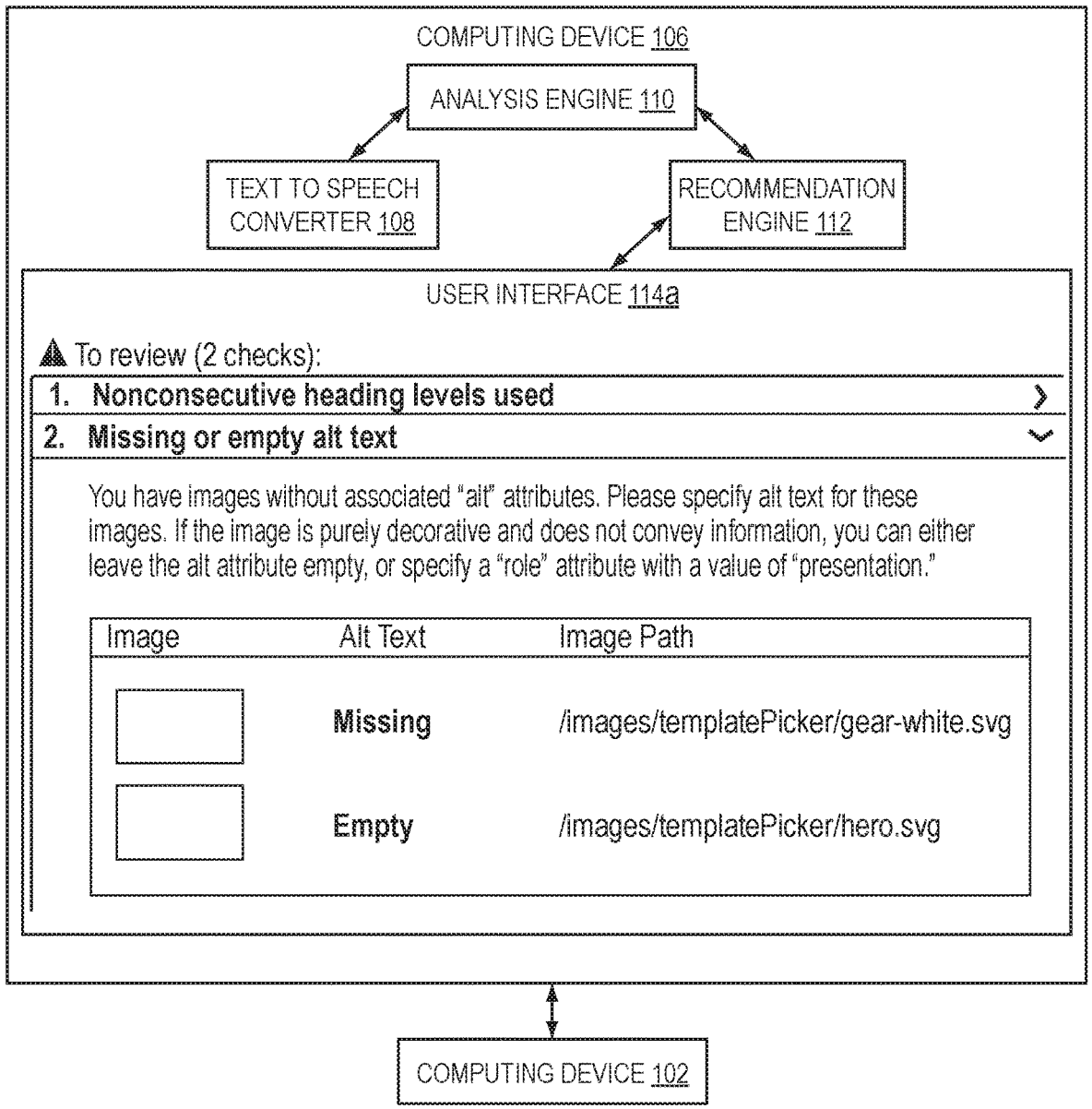
FIGS. 3A-3D are screen shots depicting embodiments of systems for improving electronic mail message design.
Figure 3B:
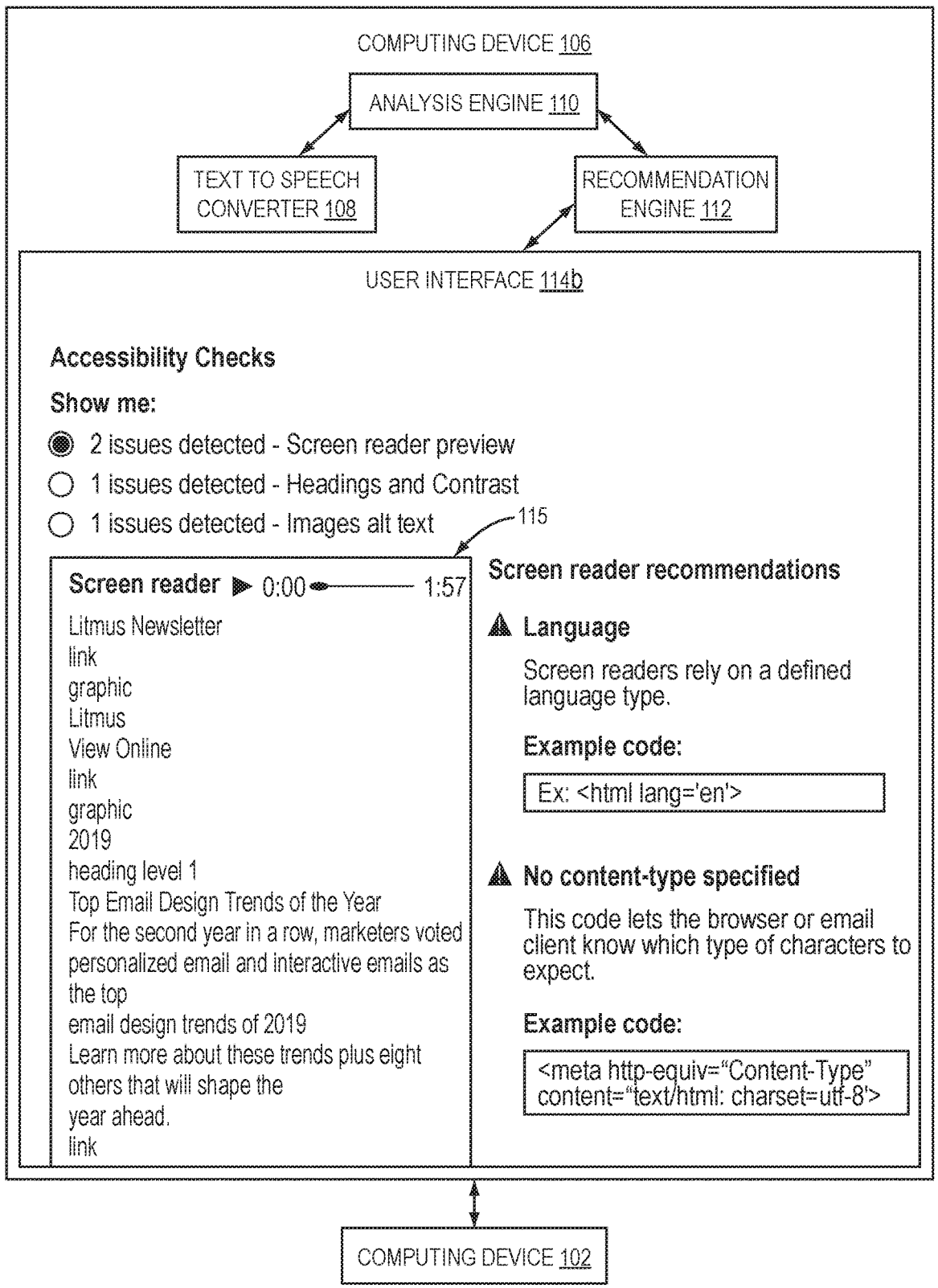
Figure 3C:
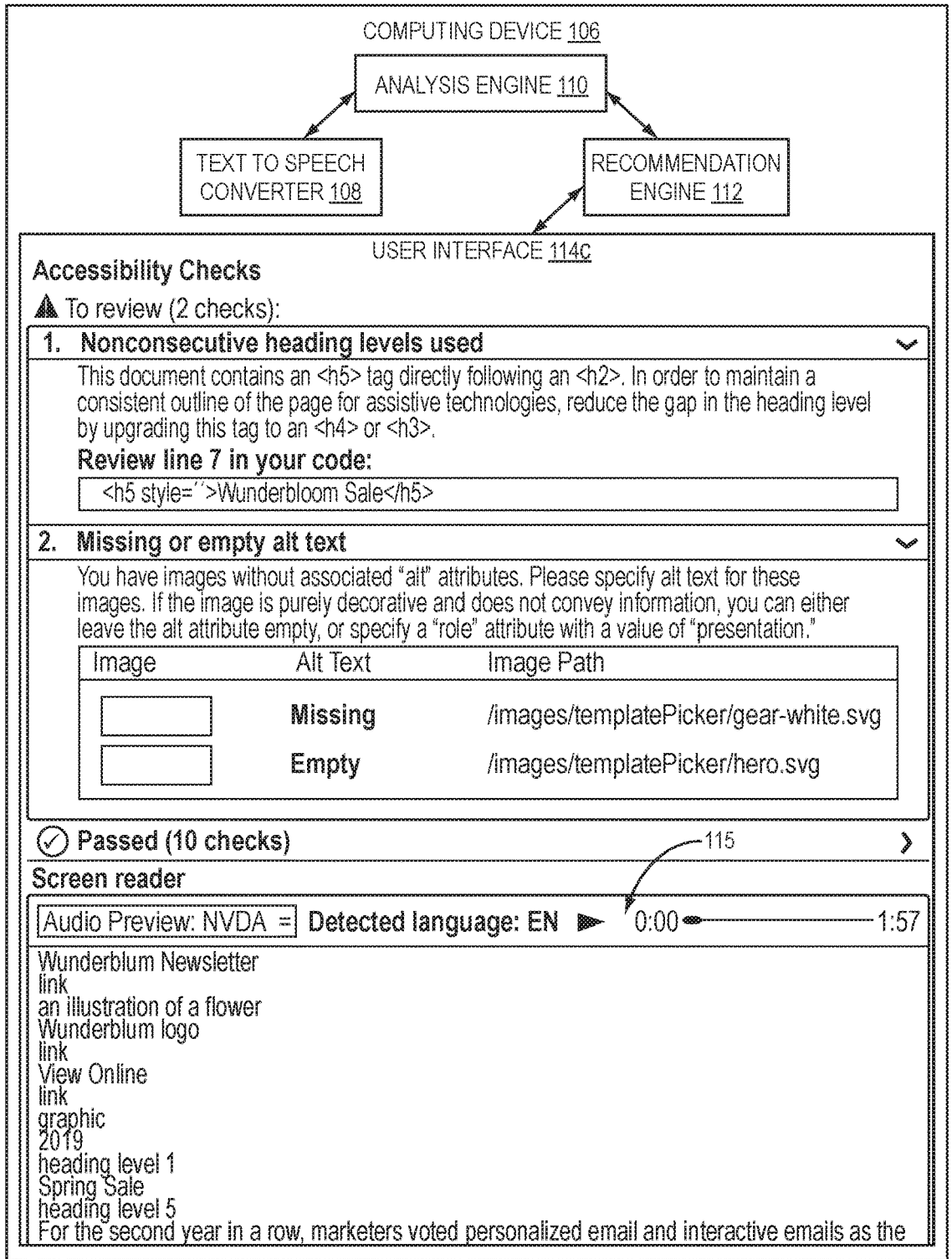
Figure 3D:
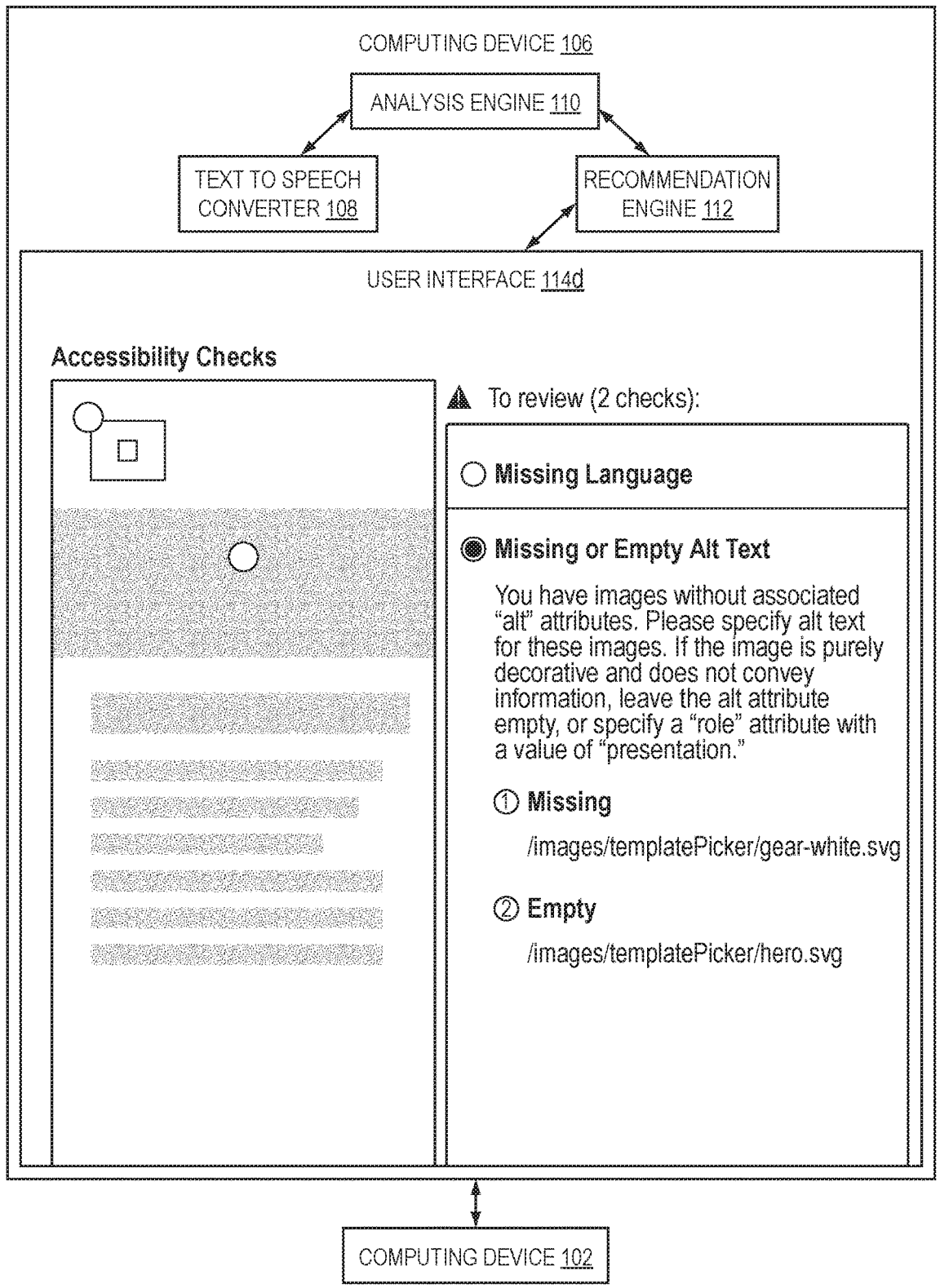

As depicted in FIG. 3A-3D, the system 200 may provide at least one user interface 114 with which to provide generated recommendations. As shown in FIG. 3A, a user interface 114a may provide an indication that certain images are missing alternative text. As shown in FIG. 3B, a user interface 114b may provide a user interface element 115 with which a user may hear a preview of what the email would sound like when read by a screen reader or other assistive device; the user interface 114b may also provide additional recommendations, such as a recommendation to define a language and to specify a content type for the email. As shown in FIG. 3B, the user interface 114b may include samples of computer programming code that users may leverage in improving their designs. As shown in FIG. 3C, a user interface 114c may include a listing of checks that have been passed for which recommendations are not needed, as well as a listing of recommendations for a user to review. As shown in FIG. 3D, a user interface 114d may include a rendering of the email message and identify sections of the email that are associated with particular recommendations.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure, possibly in combination with other embodiments of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C #, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
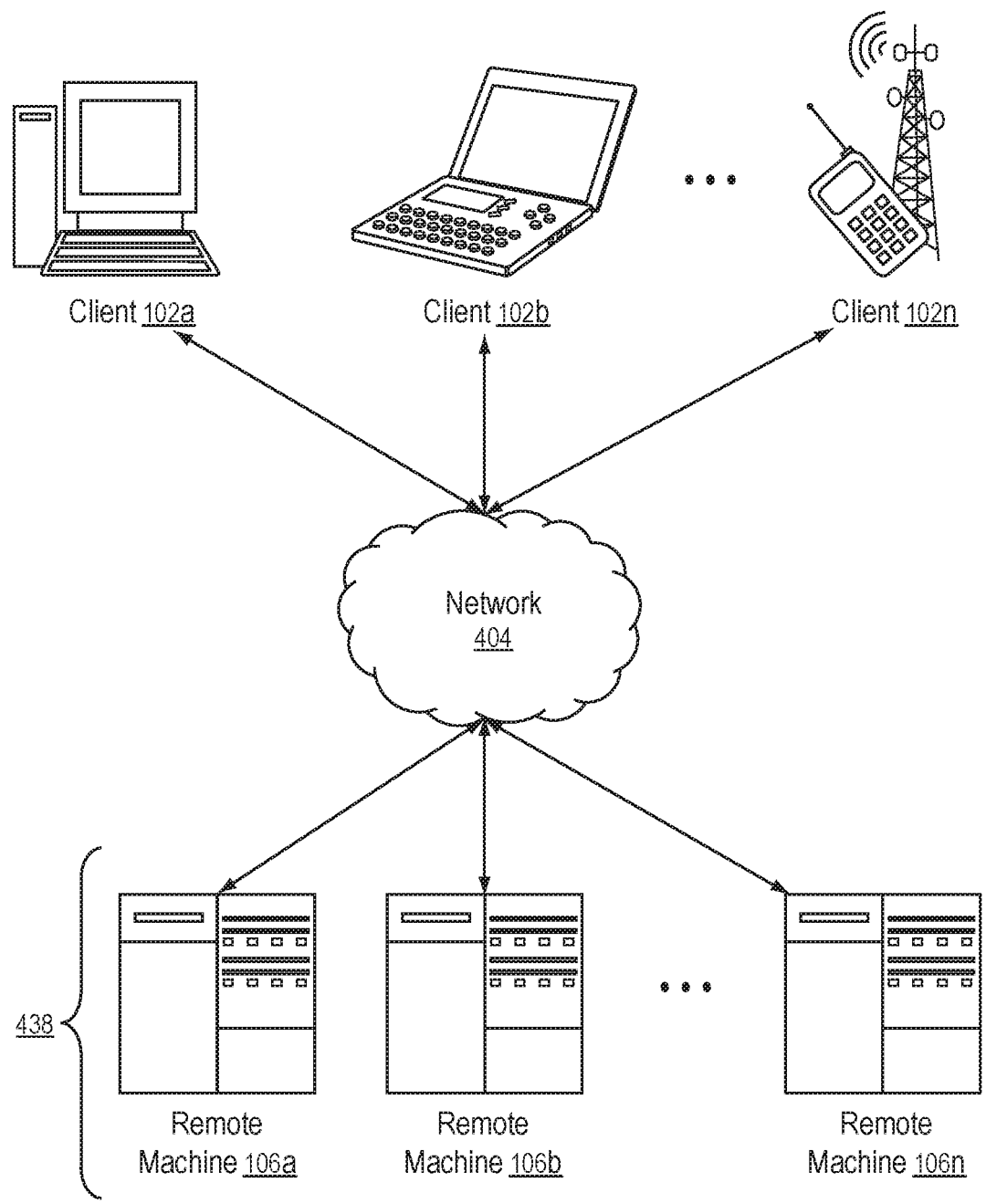
FIGS. 4A-4C are block diagrams depicting embodiments of computers useful in connection with the methods and systems described herein.
Figure 4B:
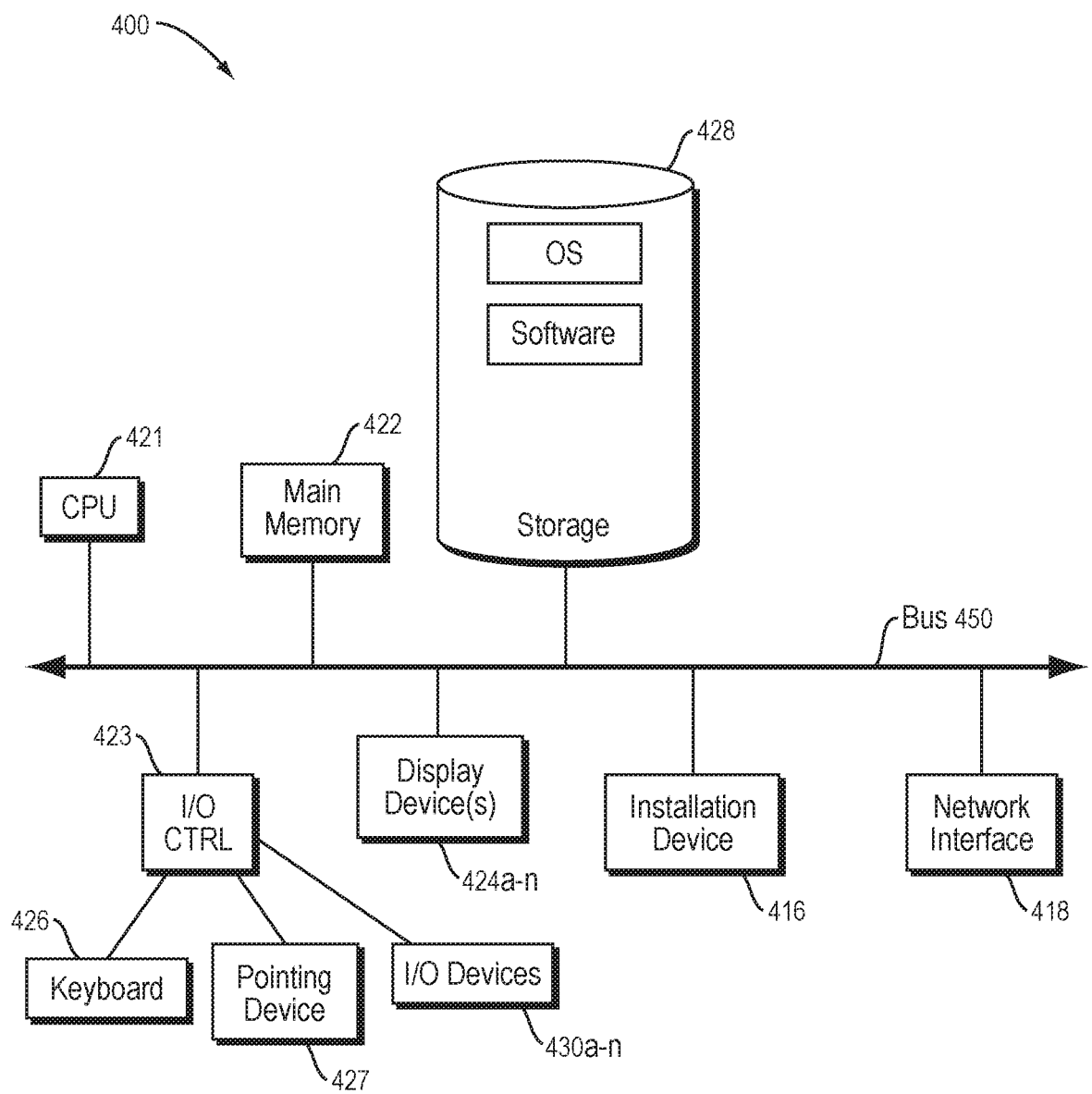
Figure 4C:
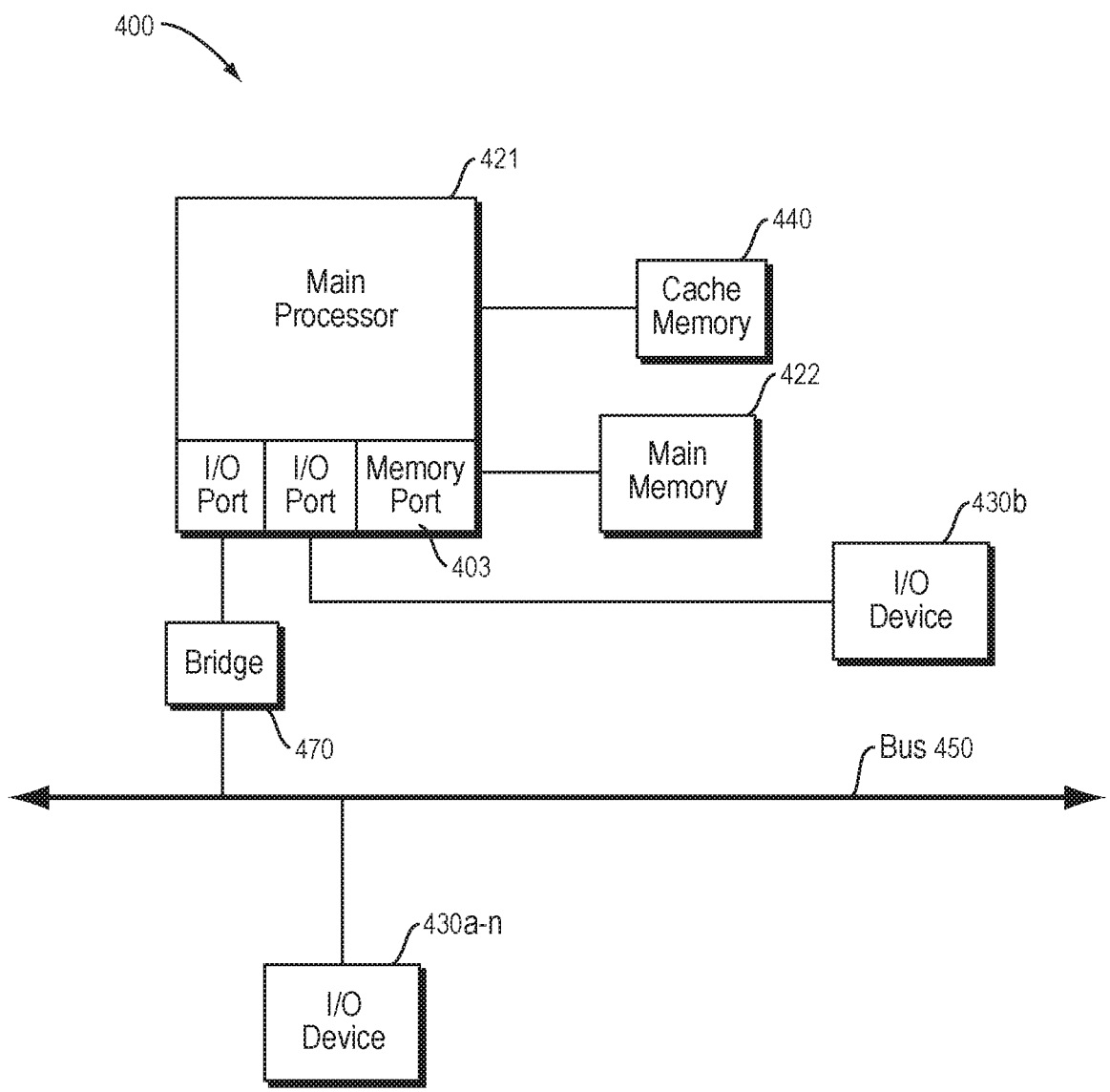

Referring now to FIGS. 4A, 4B, and 4C, block diagrams depict additional detail regarding computing devices that may be modified to execution functionality for implementing the methods and systems described above.

Referring now to FIG. 4A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 404.

Although FIG. 4A shows a network 404 between the client(s) 102 and the remote machines 106, the client(s) 102 and the remote machines 106 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the client(s) and the remote machines 106. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network 404 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client(s) 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client(s) 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client(s) 102.

In one embodiment, a computing device 106 provides functionality of a web server. In some embodiments, a web server 106 comprises an open-source web server, such as the NGINX web servers provided by NGINX, Inc., of San Francisco, Calif., or the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 438. In another of these embodiments, the server farm 438 may be administered as a single entity.

FIGS. 4B and 4C depict block diagrams of a computing device 100 useful for practicing an embodiment of the client(s) 102 or a remote machine 106. As shown in FIGS. 4B and 4C, each computing device 100 includes a central processing unit 421, and a main memory unit 422. As shown in FIG. 4B, a computing device 100 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 100 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 321 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 100 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 100' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 430 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.1-4.0, WINDOWS CE, WINDOWS XP, WINDOWS 7, WINDOWS 8, WINDOWS VISTA, and WINDOWS 10, all of which are manufactured by Microsoft Corporation of Redmond, Wash.; any version of MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 400 is a portable media player or digital audio player supporting file formats including, but not limited to, MP3, WAV, M4A/AAC, WMA Protected AAC, AEFF, Audible audiobook, Apple Lossless audio file formats, and .mov, .mov, and .mp 4 MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Having described certain embodiments of methods and systems for converting text to audio to improve structure of electronic mail messages, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for converting text in an electronic mail message into audio and using the audio to improve a design of the electronic mail message, the method comprising:
   converting, by a text-to-speech converter component executing on a first computing device, an electronic mail message into an audio file;
   analyzing, by an analysis engine executing on the first computing device, the electronic mail message, the audio file, and a transcript of the audio file to identify at least one attribute of the audio file;
   receiving, by a recommendation engine executing on the first computing device, an identification of the at least one attribute of the audio file;
   generating, by the recommendation engine, at least one recommendation for improving a design of the electronic mail message, based on the identification of the at least one attribute of the audio file; and
   providing, by the first computing device, to a second computing device, the audio file and the generated at least one recommendation.

2. The method of claim 1 further comprising receiving, by the first computing device, the electronic mail message from the second computing device.

3. The method of claim 1 further comprising generating, by the text-to-speech converter, the transcript of the audio file.

4. The method of claim 1 further comprising generating a speech synthesis markup language document based on the electronic mail message.

5. The method of claim 4, wherein analyzing further comprises analyzing the speech synthesis markup language document.

6. The method of claim 1, wherein analyzing further comprises identifying an attribute of the electronic mail message.

7. The method of claim 1, wherein analyzing further comprises identifying an attribute of the transcript of the audio file.

8. The method of claim 1 further comprises applying, by the recommendation engine, a rule to the identification of the at least one attribute.

9. The method of claim 1, wherein generating the recommendation further comprises generating a recommendation to include alternate text for at least one image embedded in the electronic mail message.

10. The method of claim 1, wherein generating the recommendation further comprises generating a recommendation to increase an amount of text within the electronic mail message.

11. The method of claim 1, wherein generating the recommendation further comprises generating a recommendation to improve a level of compliance with an accessibility standard.

12. A system for converting text in an electronic mail message into audio and using the audio to improve a design of the electronic mail message comprising:

text-to-speech converter component executing on a first computing device, receiving, from a second computing device, an electronic mail message, converting the electronic mail message into an audio file, and generating a transcript of the audio file;

an analysis engine executing on the first computing device and analyzing the electronic mail message, the audio file, and the transcript to identify at least one attribute of the audio file; and a recommendation engine executing on the first computing device, receiving an identification of the at least one attribute of the audio file, generating at least one recommendation for improving a design of the electronic mail message, based on the identification of the at least one attribute of the audio file, and providing, to the second computing device, the audio file and the generated at least one recommendation.

13. The system of claim 12, wherein the analysis engine further comprises means for identifying an attribute of the electronic mail message.

14. The system of claim 12, wherein the analysis engine further comprises means for identifying an attribute of the transcript of the audio file.

15. The system of claim 12, wherein the recommendation engine further comprises means for applying a rule to the identification of the at least one attribute.

16. The system of claim 12, wherein the recommendation engine further comprises means for generating a recommendation to include alternate text for at least one image embedded in the electronic mail message.

17. The system of claim 12, wherein the recommendation engine further comprises means for generating a recommendation to increase an amount of text within the electronic mail message.

18. The system of claim 12, wherein the recommendation engine further comprises means for generating a recommendation to improve a level of compliance with an accessibility standard.

* * * * *